United States Patent [19]

Saito et al.

[11] 3,911,367

[45] Oct. 7, 1975

[54] REMOTE CONTROLLED RECEIVING APPARATUS WHICH PREVENTS ERRONEOUS OPERATION DUE TO NOISE

[75] Inventors: Hiroshi Saito; Kunito Miyamoto, both of Katano, Japan

[73] Assignee: Matsushita Electric Industrial Co., Ltd., Osaka, Japan

[22] Filed: May 31, 1973

[21] Appl. No.: 365,731

[30] Foreign Application Priority Data

| | | |
|---|---|---|
| June 2, 1972 | Japan | 47-55278[U] |
| June 2, 1972 | Japan | 47-65511[U] |
| June 2, 1972 | Japan | 47-65512[U] |
| June 2, 1972 | Japan | 47-65513[U] |
| June 2, 1972 | Japan | 47-65514[U] |
| June 2, 1972 | Japan | 47-65515[U] |
| June 2, 1972 | Japan | 47-65516[U] |
| June 19, 1972 | Japan | 47-72896[U] |
| June 19, 1972 | Japan | 47-72897[U] |
| June 19, 1972 | Japan | 47-72898[U] |

[52] U.S. Cl. ......... 325/392; 178/DIG. 15; 325/478; 343/228

[51] Int. Cl.$^2$ ........................................ H04B 1/10

[58] Field of Search ........................... 325/390–393, 325/476, 478; 178/DIG. 15; 343/228; 340/15, 171 R; 317/147

[56] References Cited

UNITED STATES PATENTS

| | | | |
|---|---|---|---|
| 2,930,890 | 3/1960 | Lenk | 325/478 |
| 2,959,716 | 11/1960 | Gordon, Jr. | 317/147 |
| 3,168,738 | 2/1965 | Curll | 325/390 |
| 3,750,033 | 7/1973 | Fukata | 325/478 |

*Primary Examiner*—George H. Libman
*Attorney, Agent, or Firm*—Stevens, Davis, Miller & Mosher

[57] ABSTRACT

A remote controlled receiving apparatus for remotely controlling channel selection, on-off switching of a power source, volume adjustment or the like for television receiver sets and providing an improvement of the same which is free from erroneous operation due to noises such as telephone ring, banging of a door and the like.

5 Claims, 20 Drawing Figures

REMOTE CONTROLLED RECEIVING APPARATUS WHICH PREVENTS ERRONEOUS OPERATION DUE TO NOISE

This invention relates to a remote controlled receiving apparatus for remotely controlling channel selection, switching of a power source, volume adjustment or the like for television reciver sets.

More particularly, the invention contemplates a remote controlled receiving apparatus in which an ultrasonic wave signal transmitted from a transmitter set is received to remotely effect the driving of a motor used for channel selection, on-off switching of a power source or driving of a stepping relay used for volume adjustment.

Generally, a remote controlled system for television receiver sets utilizes an ultrasonic wave signal at a single frequency, while such noises as telephone ring, the bang of a door and the like also contain a component wave of high level at the same frequency as the ultrasonic wave signal. For this reason, conventional remote controlled apparatuses have suffered from erroneous operation such that the driven circuit unit is actuated by the noises. Accordingly, the invention intends to provide an improved remote controlled receiving apparatus capable of preventing the erroneous operation.

The principal object of the invention is to provide an improved remote controlled receiving apparatus wherein channel selection, switching of a power source or volume adjustment is not effected by the noises such as telephone ring, the bang of a door and the like, and driven circuit units are actuated only when an ultrasonic wave signal at a single frequency (for example 38.5 KHz or 41.5 KHz) transmitted from a transmitter set is received.

In accordance with this apparatus, such an excellent effect can be obtained that the erroneous operation can be prevented by actuating driven circuit units only when a control signal at the single frequency is received.

Further objects and advantages of the invention will become apparent from the following detailed description taken in conjunction with the accompanying drawings.

Figure 8:
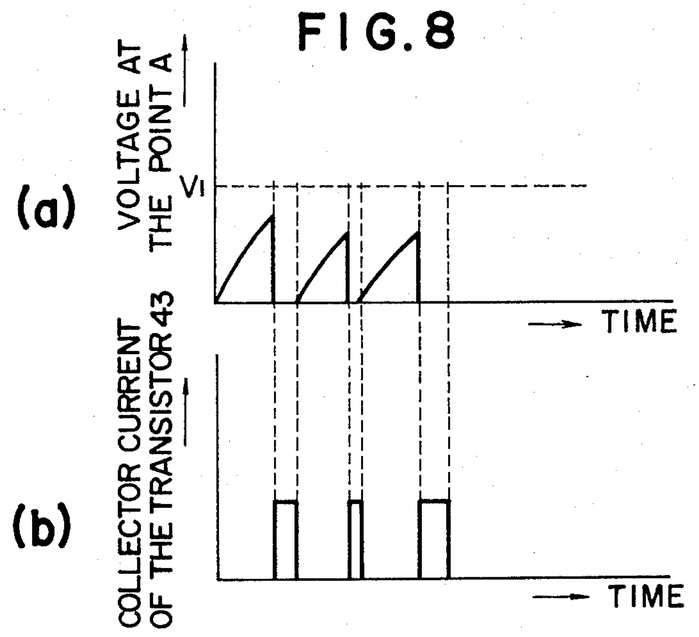
Figure 9:
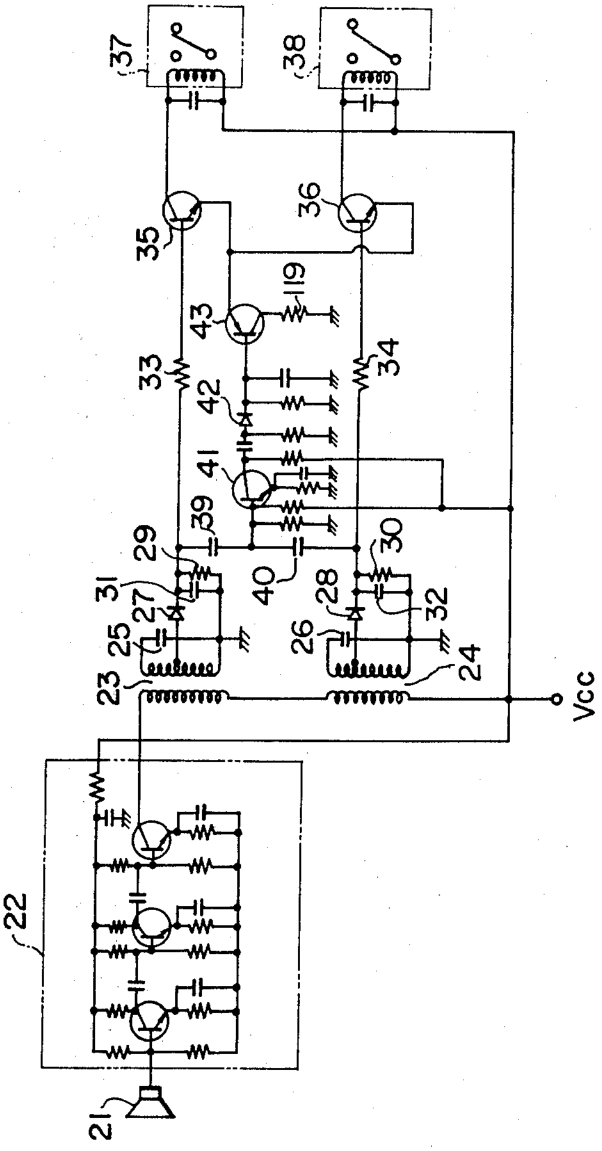
Figure 10:
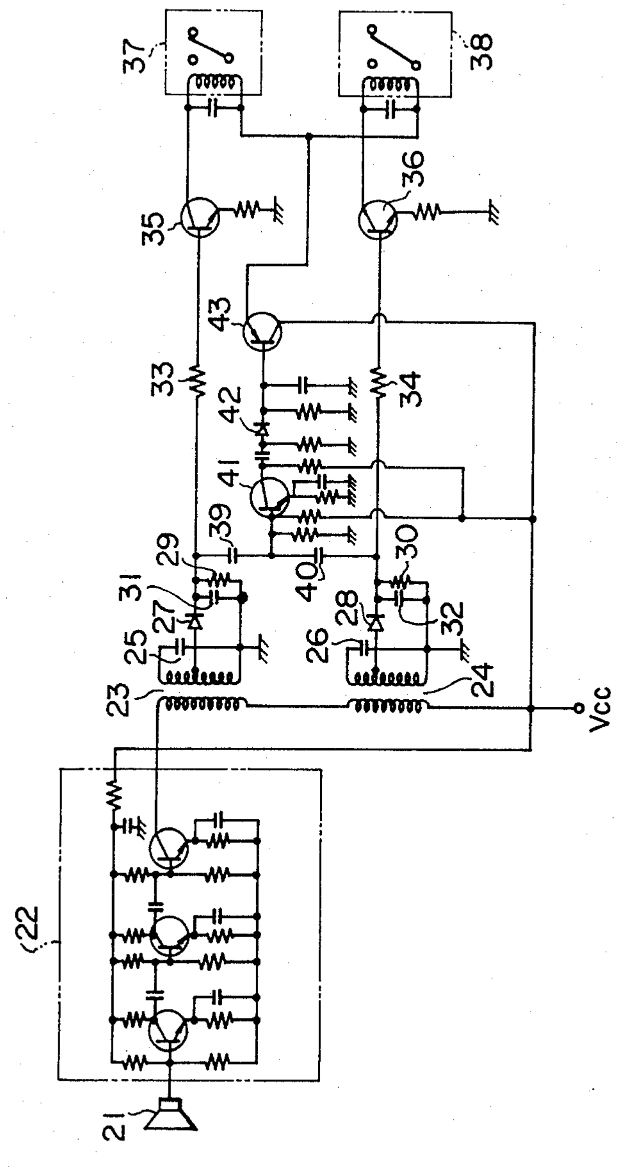
Figure 11:
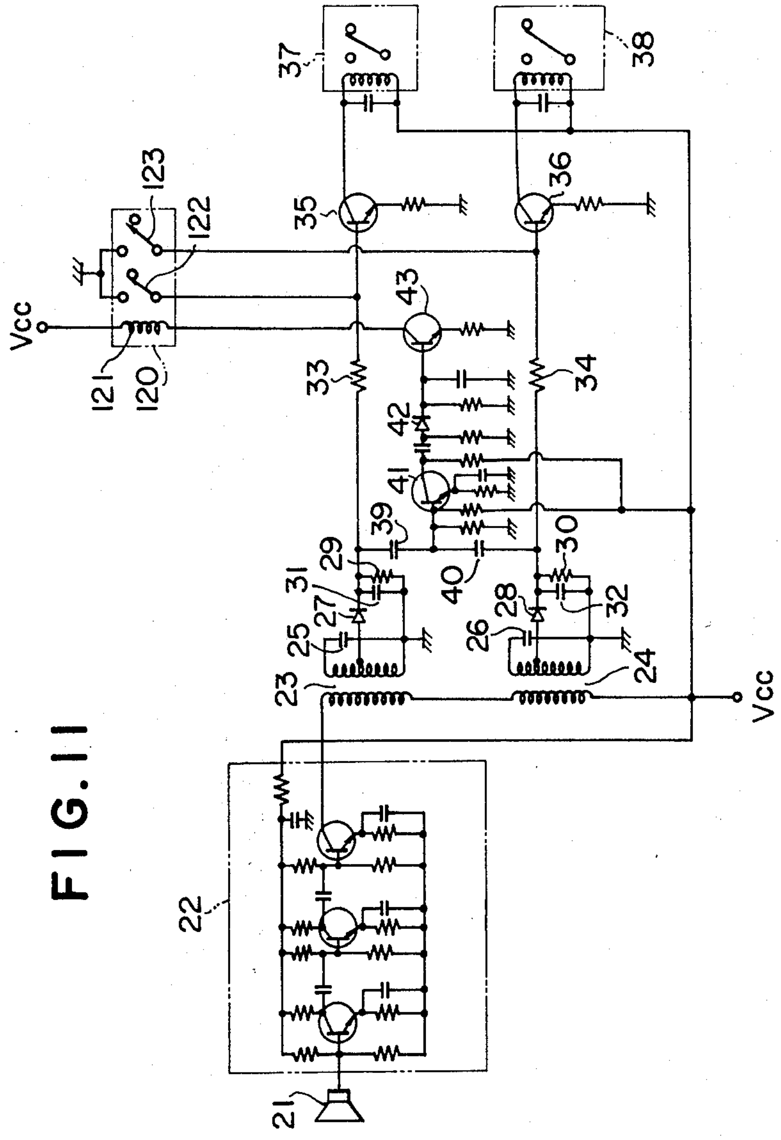
Figure 12:
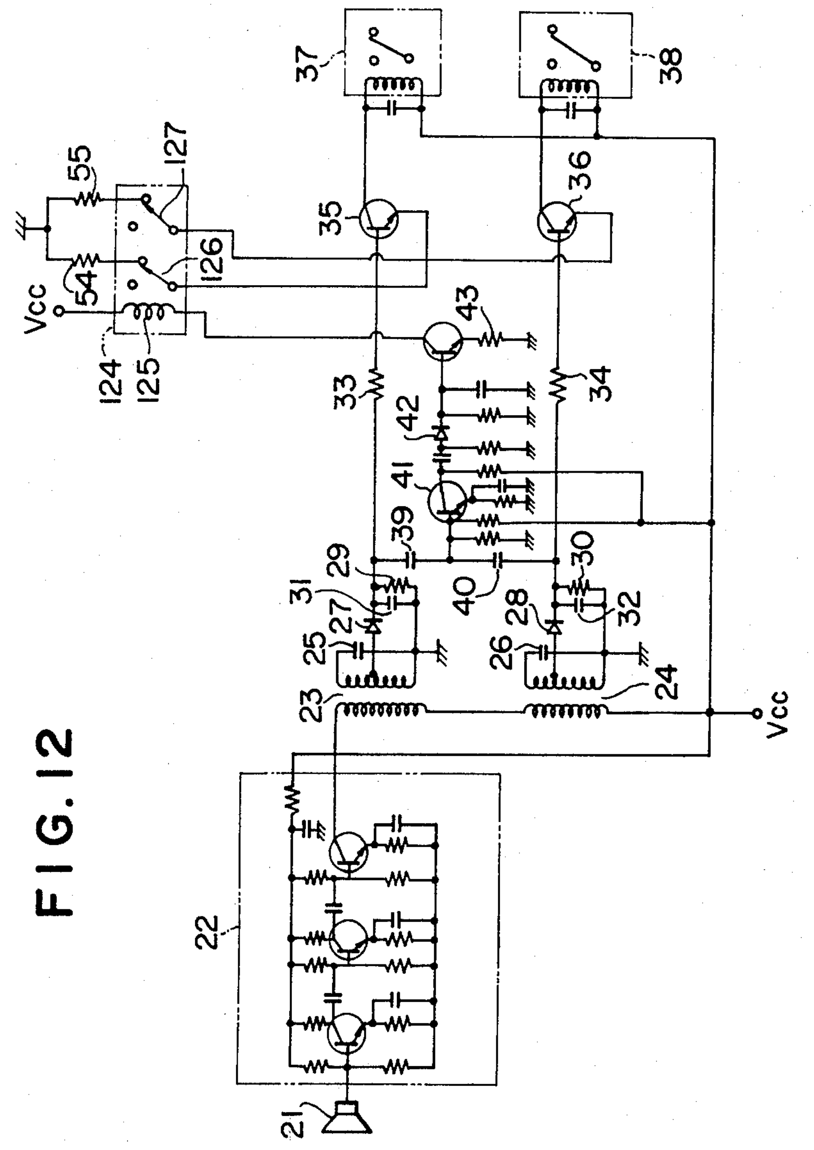
Figure 13:
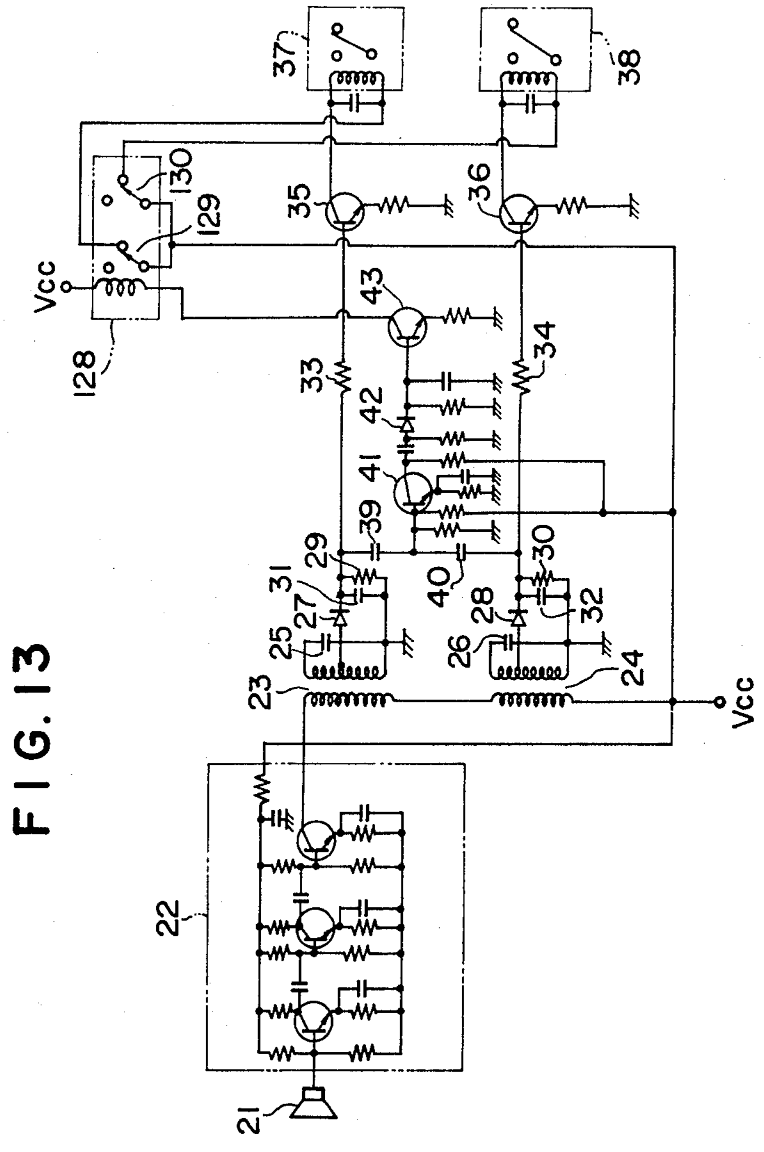
Figure 14:
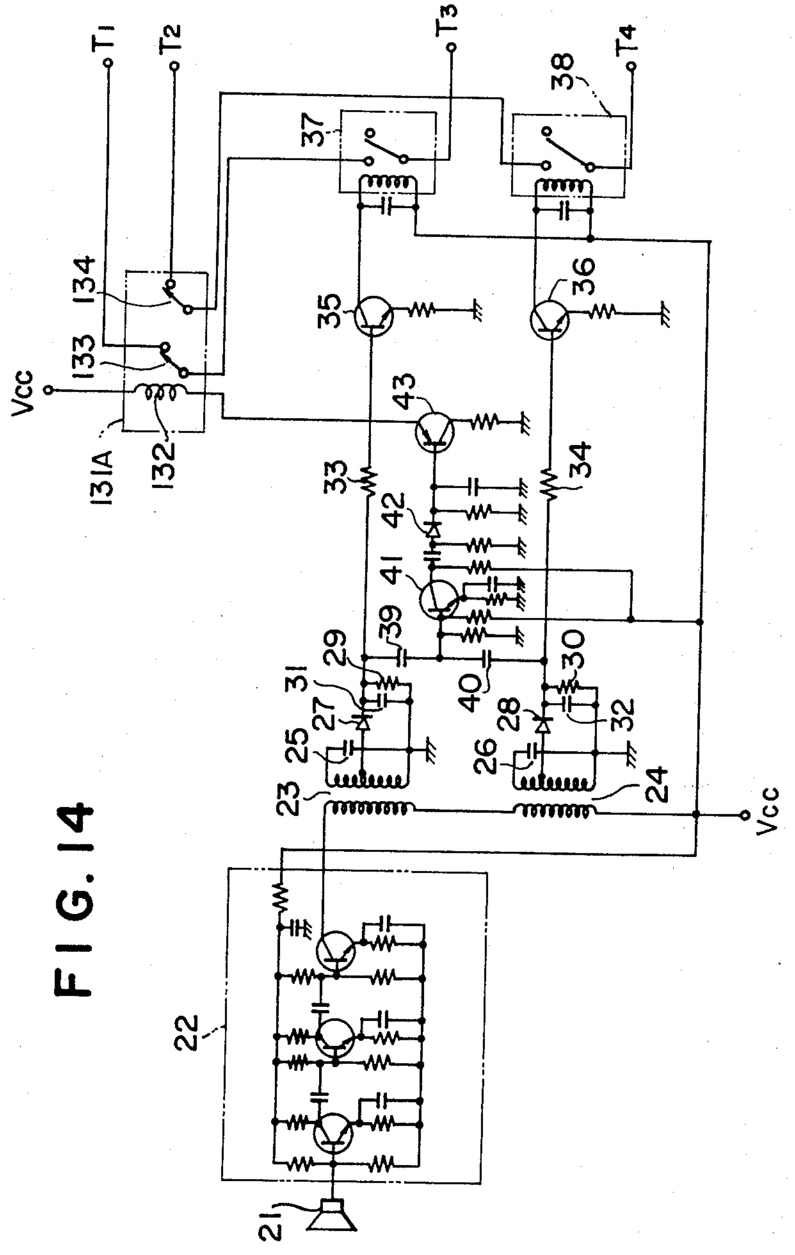
Figure 15:
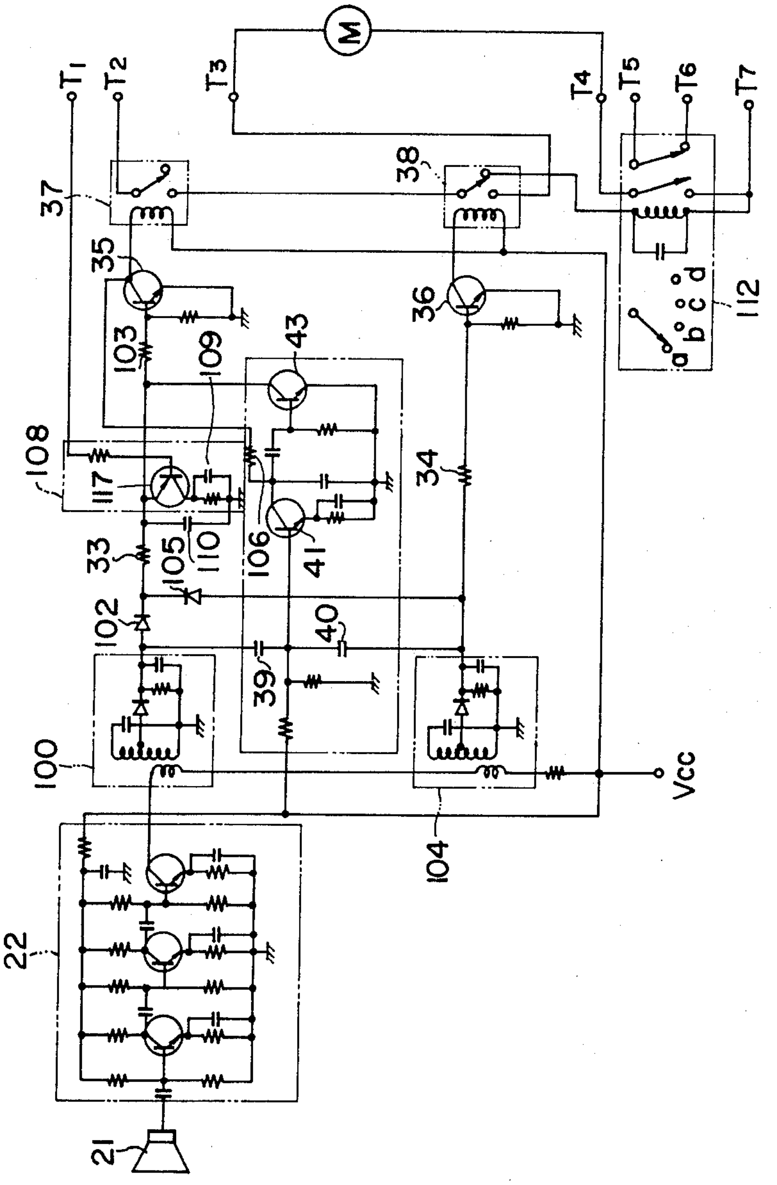
Figure 16:
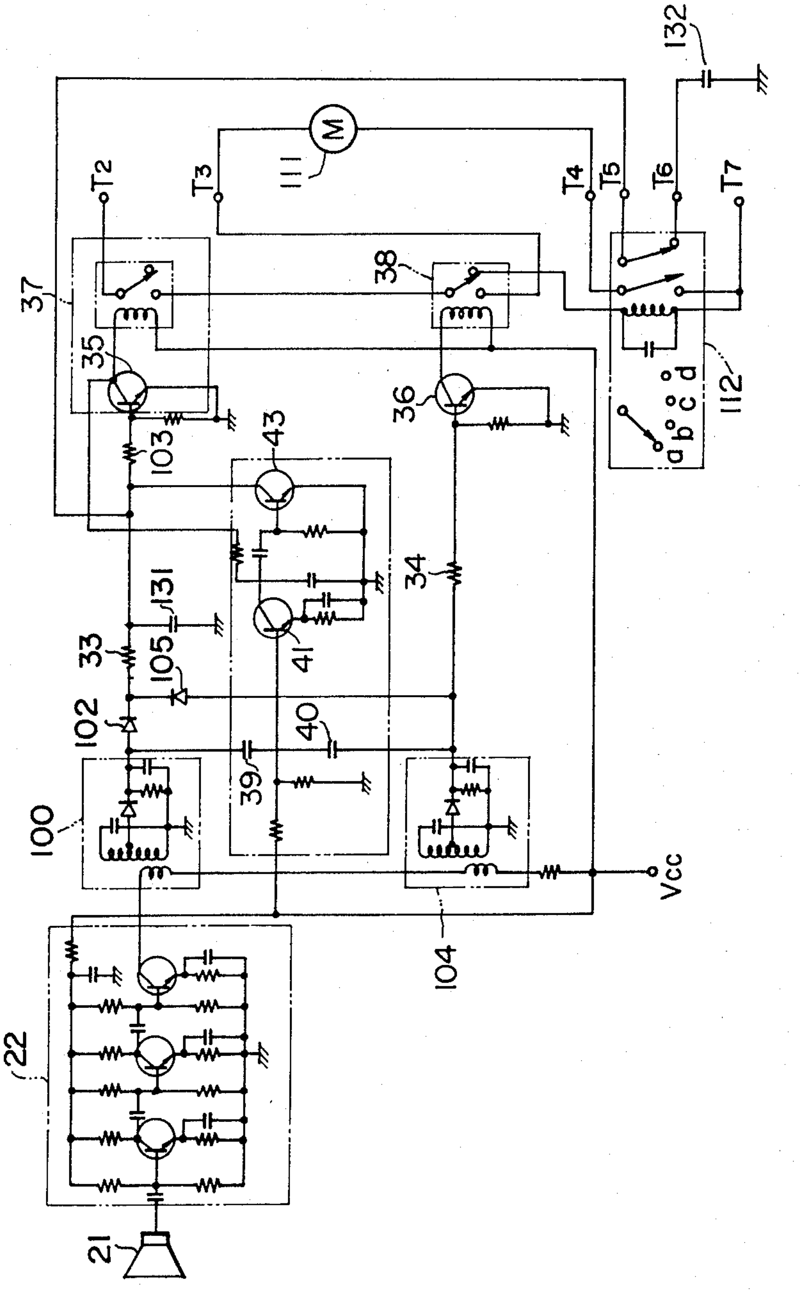
Figure 17:
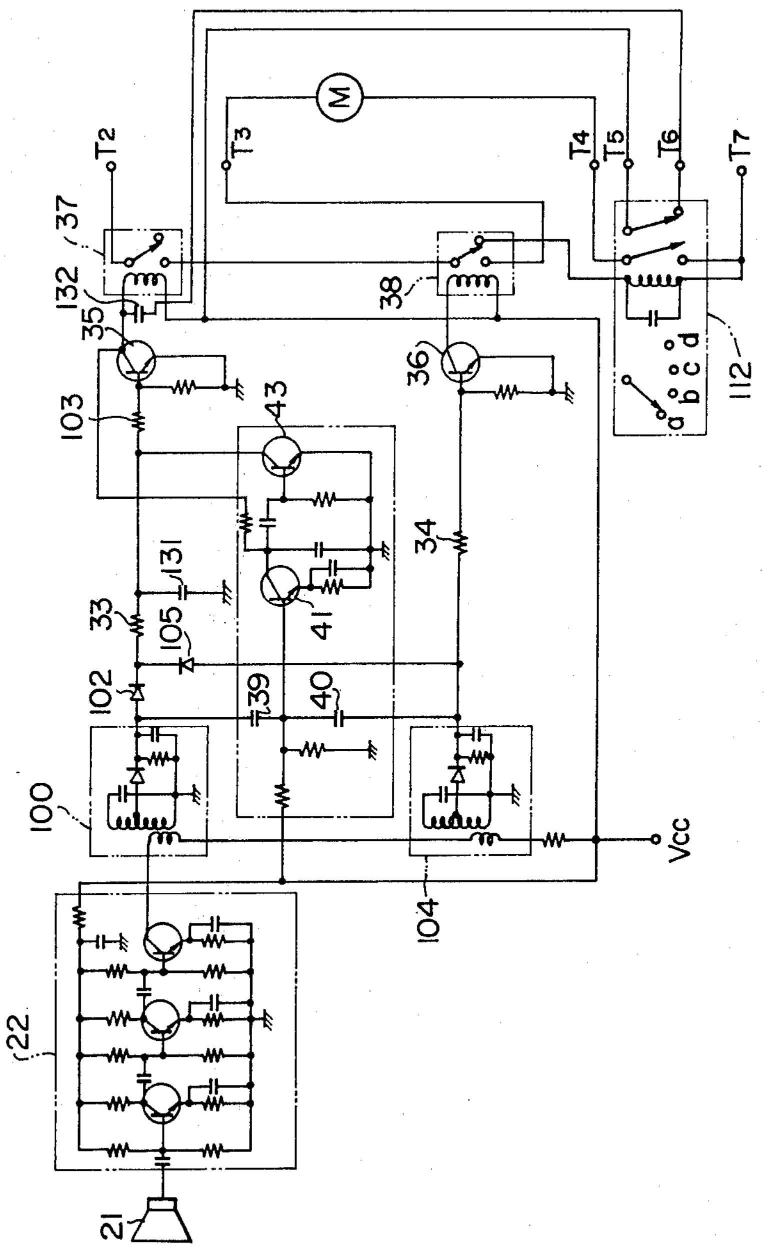
Figure 18:
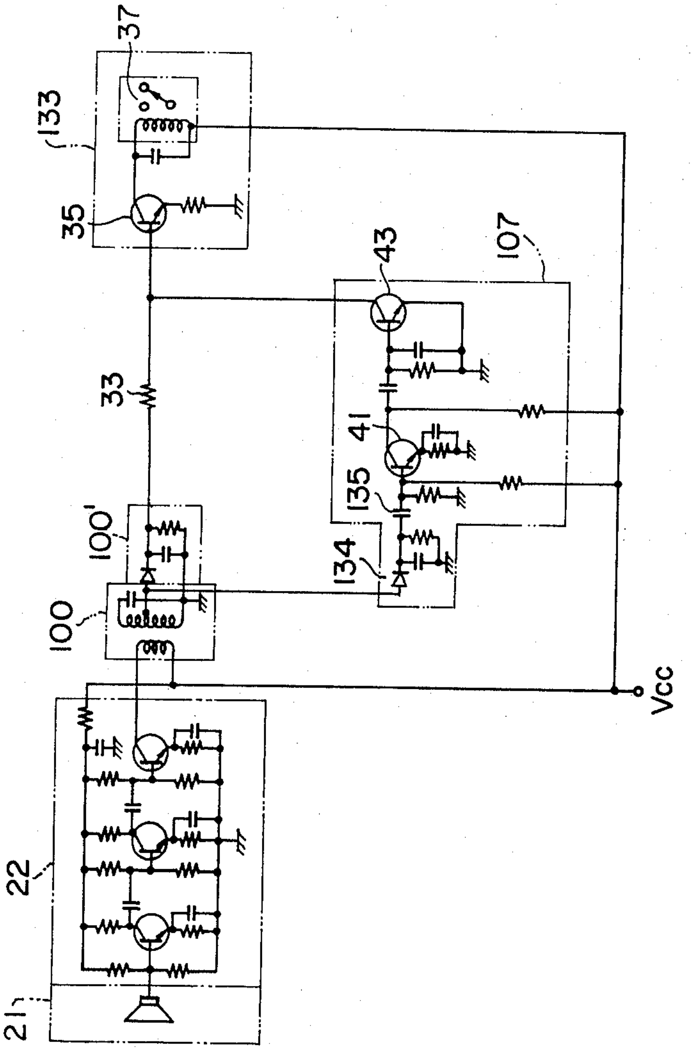
Figure 19:
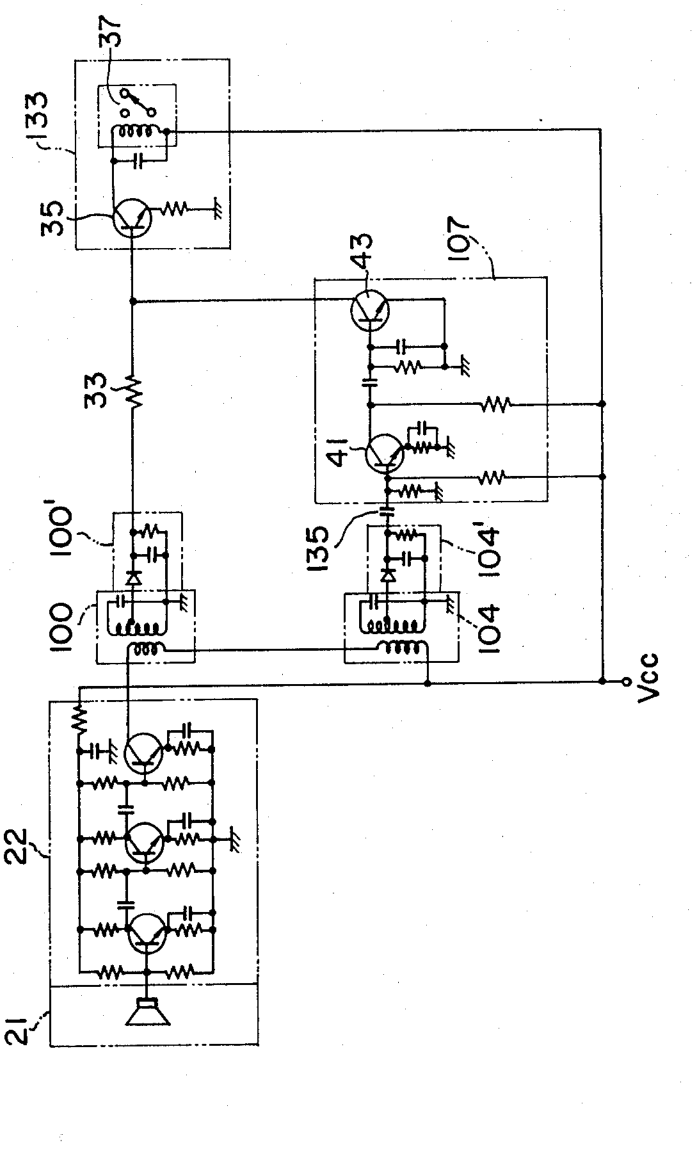
Figure 20:
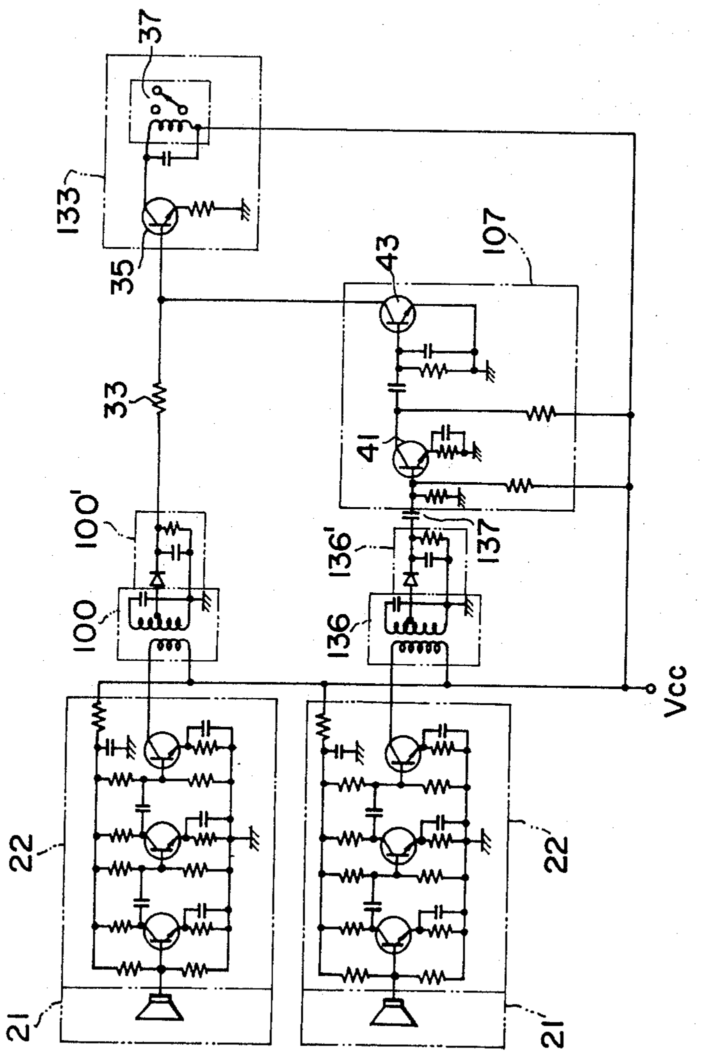

FIGS. 8(*a*) and (*b*) are graphs depicting respectively variations in voltage and in current at the point A when a noise is received;

FIG. 9 is a circuit diagram of a fifth embodiment embodying the present invention;

FIG. 10 is a modified circuit of FIG. 9 to a slight extent;

FIG. 11 is a circuit diagram of a sixth embodiment of remote controlled apparatus embodying the invention;

FIG. 12 is a circuit diagram of a seventh embodiment of the present invention;

FIG. 13 is a circuit diagram of an eighth embodiment of the present invention;

FIG. 14 is a circuit diagram of a ninth embodiment of the present invention;

FIG. 15 is a circuit diagram of a tenth embodiment of the invention;

FIG. 16 is a circuit diagram of an eleventh embodiment of the invention;

FIG. 17 is a circuit diagram of a twelfth embodiment of the invention;

FIG. 18 is a circuit diagram of a thirteenth embodiment of the invention;

FIG. 19 is a circuit diagram of a fourteenth embodiment of the invention; and FIG. 20 is a circuit diagram of fifteenth embodiment of the invention.

Figure 1:
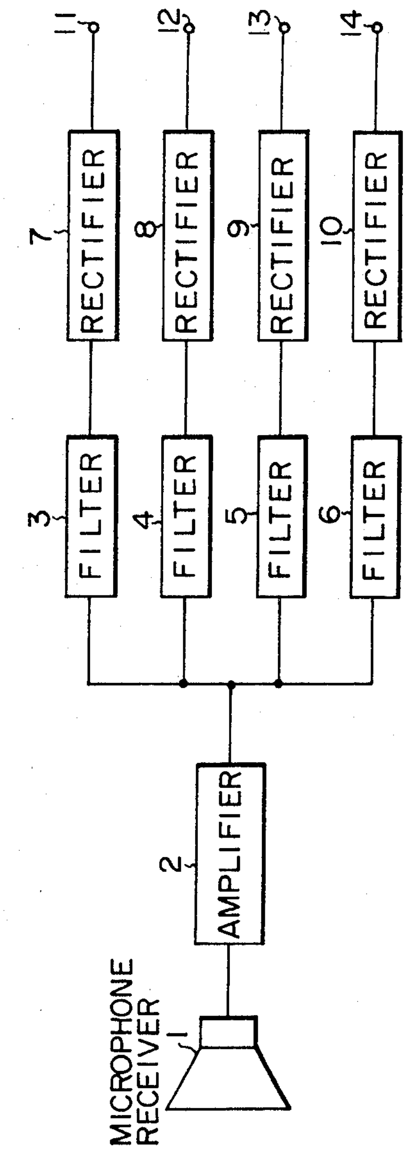
FIG. 1 is a block diagram of an apparatus for measuring frequency components of each noise and control signal.

Referring now to FIG. 1, a measuring apparatus for frequency components of a noise and a control signal comprises a microphone 1 for catching the noise or control signal such as an ultrasonic wave, an amplifier 2 for amplifying the noise or control signal, filters 3, 4, 5 and 6 tunable to different frequencies $f_1$, $f_2$, $f_3$ and $f_4$ for separating the amplified signal and rectifiers 7, 8, 9 and 10 through which the separated frequencies are derived to be forwarded to an oscilloscope for observation.

For the experimental purpose, three kinds of collision noises A, B and C having different characters and a signal at a single frequency generated by a transistor oscillator were selectively used as the noise and the control signal, respectively.

Figure 2:
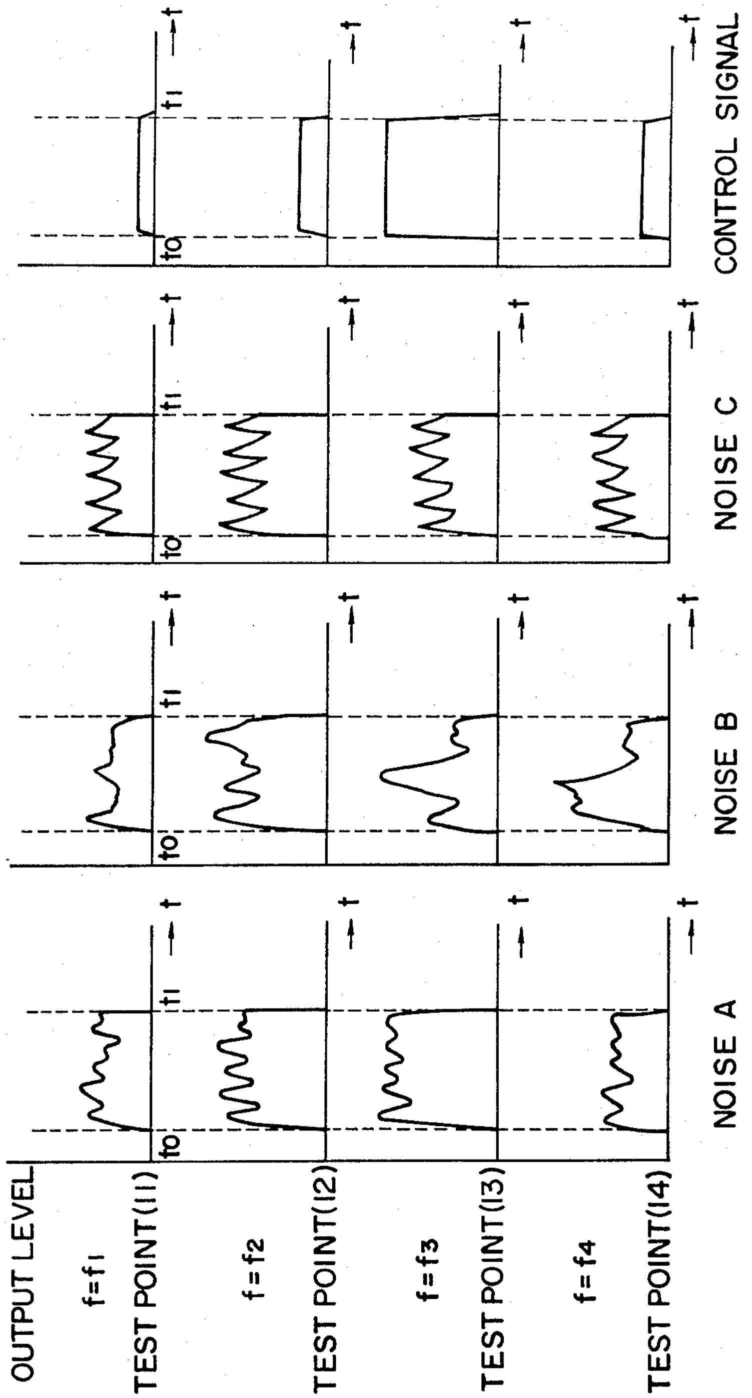
FIG. 2 is a signal waveform diagram of signals appearing at respective output terminals of the apparatus shown in FIG. 1.

FIG. 2 illustrates waveforms appearing at respective output terminals 11, 12, 13 and 14 of the apparatus shown in FIG. 1, where the abscissa represents the time axis and the noise A, B or C, or the control signal appears at $t=t_o$ and disappears at $t=t_1$ while the ordinate respresents the output level at respective rectifying terminals 11, 12, 13 and 14, wherein different frequency components $f_1$, $f_2$, $f_3$ and $f_4$ contained in respective noises A, B and C or the control signal are depicted in this order from the upper graph to the lower one.

It will be seen from FIG. 2 that the control signal (of oscillation frequency $f_3$) has a flat output characteristic between $t=t_o$ and $t=t_1$ whereas the output characteristic of the noises is not flat on account of alternating components contained therein and the output level of the individual filter is excessive with short-duration noise.

The smaller the distance between a noise source and the microphone 1, the greater the output level; however, the foregoing tendency stands unchanged.

Under the consideration of the difference in characters between the noise and the control signal at the single frequency, this invention intends to provide a remote controlled receiving apparatus wherein the driven circuit unit is immune to the noise but actuated only when the control signal at the single frequency is received. One embodiment of the invention will be explained hereunder with reference to FIG. 3.

Figure 3:
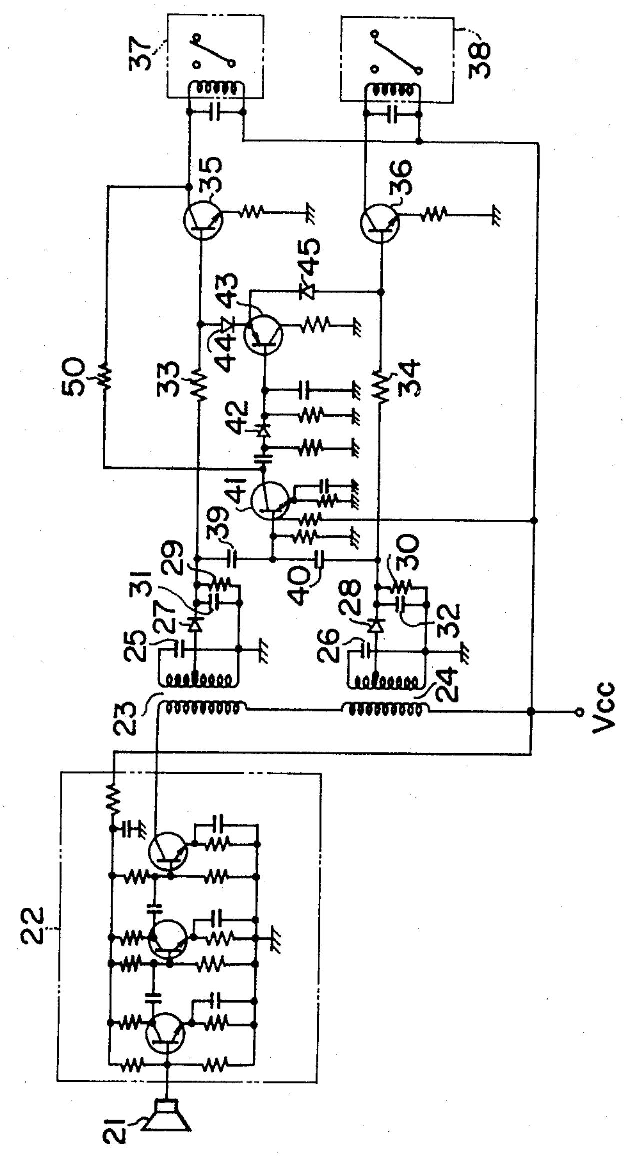
FIG. 3 is a circuit diagram of a first embodiment of a remote controlled receiving apparatus embodying the invention.

In FIG. 3, numeral 21 designates a microphone for sensing an incident signal such as an ultrasonic wave through which the noise or a carrier frequency signal is passed to an amplifier 22 where it is amplified, then an amplified noise is separated in filters including transformer coils 23 and 24 and tuning capacitors 25 and 26, and the separated signals are respectively passed through rectifier diodes 27 and 28 to be stored as a voltage in capacitors 31 and 32 shunted by resistors 29 and 30. The stored voltages are applied respectively to the bases of driver transistors 35 and 36 through voltage drop resistors 33 and 34. Reference numerals 37 and 38 designate relays which are respectively driven by the driver transistors 35 and 36, and when a rectified output from individual filter exceeds a predetermined value, the corresponding relay 37 or 38 is energized.

Upon receipt of the noise A, B or C as shown in FIG. 2, however, the rectified output contains alternating components, so that the alternating components are passed through coupling capacitors 39 and 40 to an AC amplifier constituted by a transitor 41 and other elements so as to be amplified, an output of which undergoes rectification in a recifier diode 42 to be applied to the base of a transistor 43. Between the emitter of transistor 43 and a junction of the voltage drop resistor 33 and the base of driver transistor 35 as well as a junction of the voltage drop resistor 34 and the base of driver transistor 36 are connected diodes 44 and 45, respectively. Transistor 43 is set to be conductive when the alternating components contained in the rectified outputs from the rectifier diodes 27 and 28 exceed a predetermined value. Under conduction of the transistor 43, voltage drops develop across the voltage drop resistors 33 and 34 to decrease voltages at the bases of driver transistors 35 and 36 so that driven circuit units comprised of the driver transistors 35 and 36 and relays 37 and 38 as well are deenergized.

While an embodiment shown in FIG. 3 has employed two filter circuits tunable to different frequencies, the number of filters may be one or more than three.

With a circuit arrangement shown in FIG. 3, when the noise A, B or C shown in FIG. 2 is received, the transistor 43 becomes conductive since the rectified outputs contain alternating components exceeding a predetermined value. Consequently, the driver transistors 35 and 36 become nonconductive with a result of deenergization of relays 37 and 38.

Instead, when an apparatus shown in FIG. 3 receives the control signal at the single frequency, the transistor 43 becomes nonconductive owing to the rectified outputs being cleared of alternating components with the result that the driver transistors 35 and 36 are turned on, thereby energizing relays.

In FIG. 3, also shown is a collector resistor 50 for the AC amplifier transistor 41 with one end connected to the collector of driver transistor 35.

With this circuit arrangement wherein resistor 50 is coupled between the collectors of transistors 41 and 35, when the transistor 35 is turned on by the control signal with its collector voltage being decreased, the AC amplifier transistor 41 becomes nonconductive thereby to turn off the transistor 43. For this reason, even if an oscillator for emanating the control signal flutters during oscillation, the transistor will not operate and thus the erroneous operation will be prevented.

Figure 4:
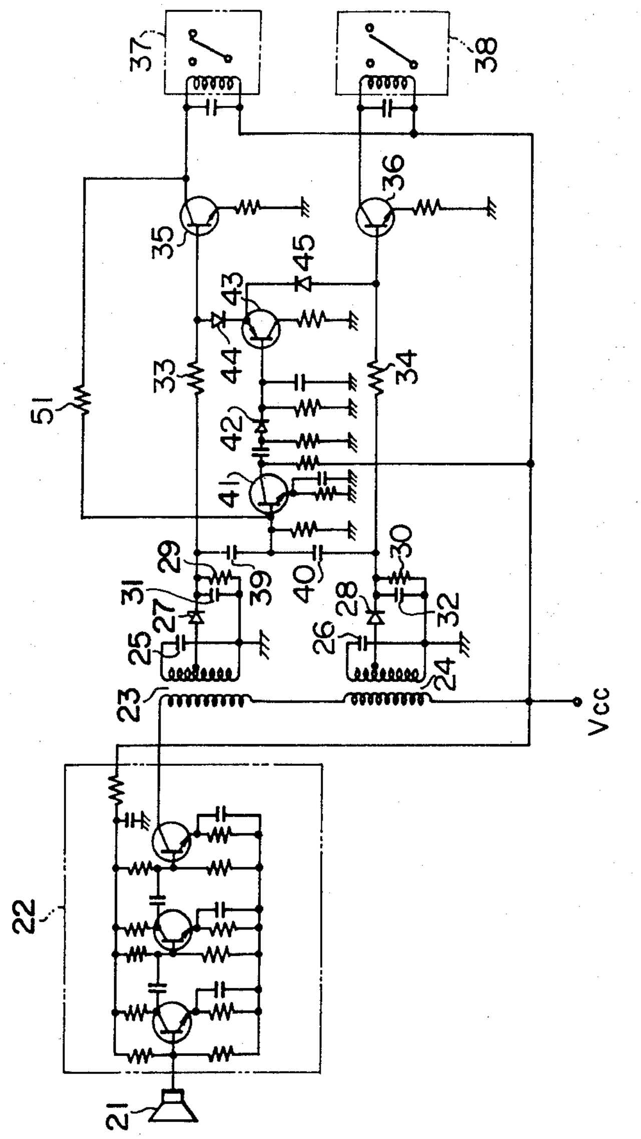
FIG. 4 is a circuit diagram of a second embodiment of the present apparatus, this being a slightly modified embodiment of the embodiment shown in FIG. 3.

FIG. 4 illustrates a second embodiment of the invention. With a circuit arrangement as shown in FIG. 4 in which the collector of the driver transistor 35 is coupled to the base of an AC amplifier transistor 41 through a resistor 51, the same effect as the previous embodiment can be obtained.

Figure 5:
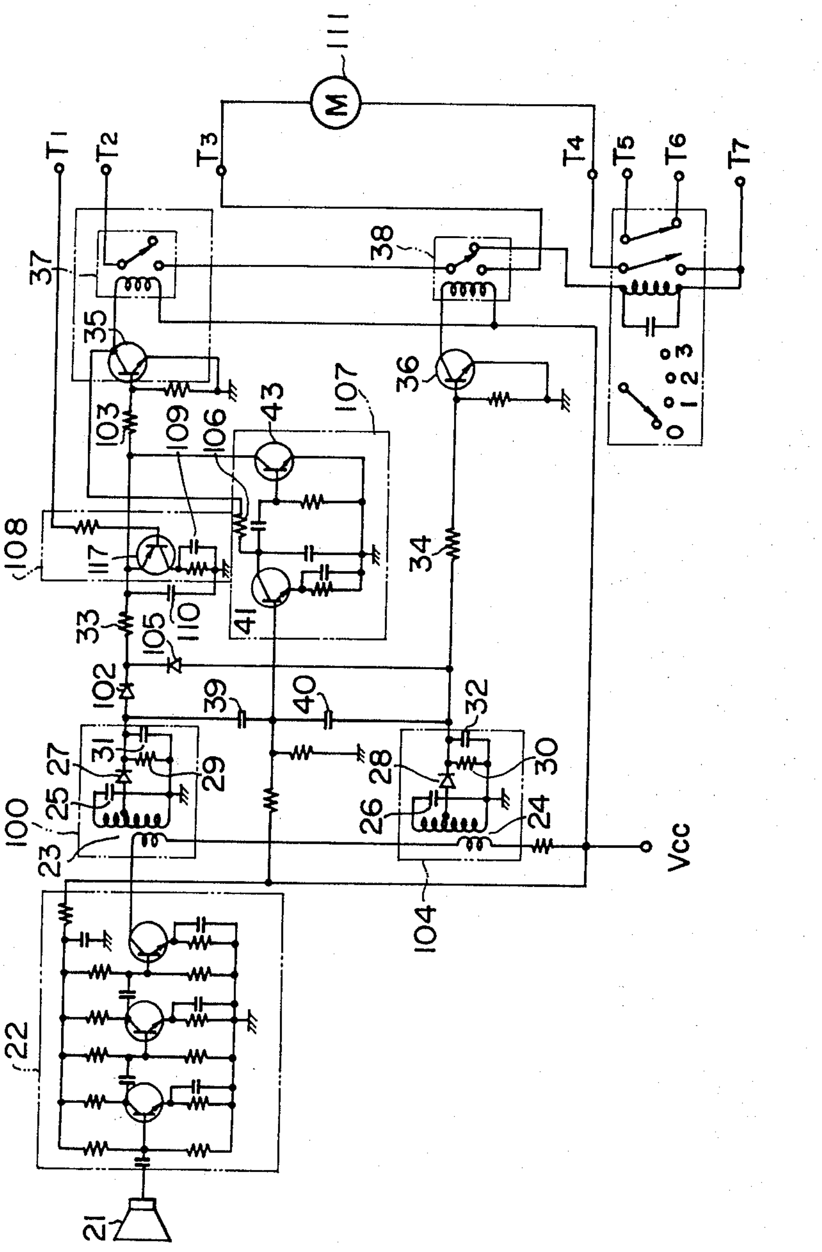
FIG. 5 is a circuit diagram of a third embodiment of remote controlled receiving apparatus embodying the invention.

FIG. 5 illustrates another embodiment of the invention. In the figure, when a voltage develops across an output capacitor 31 of a first frequency selecting detector circuit 100, the signal voltage is applied to the base of transistor 35 through a diode 102 and a series connection of resistors 33 and 103 to turn on the transistor 35 which in turn energizes a relay 37. A voltage developing across an output capacitor 32 of a second frequency selecting detector circuit 104 causes a driver transistor 36 to turn conductive through a resistor 34 and at the same time also turns on the driver transistor 35 through a diode 105 and the resistors 33 and 103. This circuit arrangement which includes a resistor 106 connecting the collector of transistor 35 to the collector of AC amplifier transistor 41 ensures the same effect as the foregoing embodiment.

Namely, the circuit shown in FIG. 5 is capable of enabling the driver transistor 35 when a voltage develops across either frequency selecting circuit 100 or 104, and disabling an inhibit circuit consisting of transistors 41 and 43 when the driver transistor 35 is in conduction.

In the figure, numeral 108 designates a switching circuit for connecting a capacitor 109 to a capacitor 110 in parallel relation in order to increase a delay in commencement of the driven circuit unit only when the power source for a television receiver set is turned on, and numeral 111 a monitor for monitoring channel selection, volume control or the like of a television receiver set.

Figure 6:
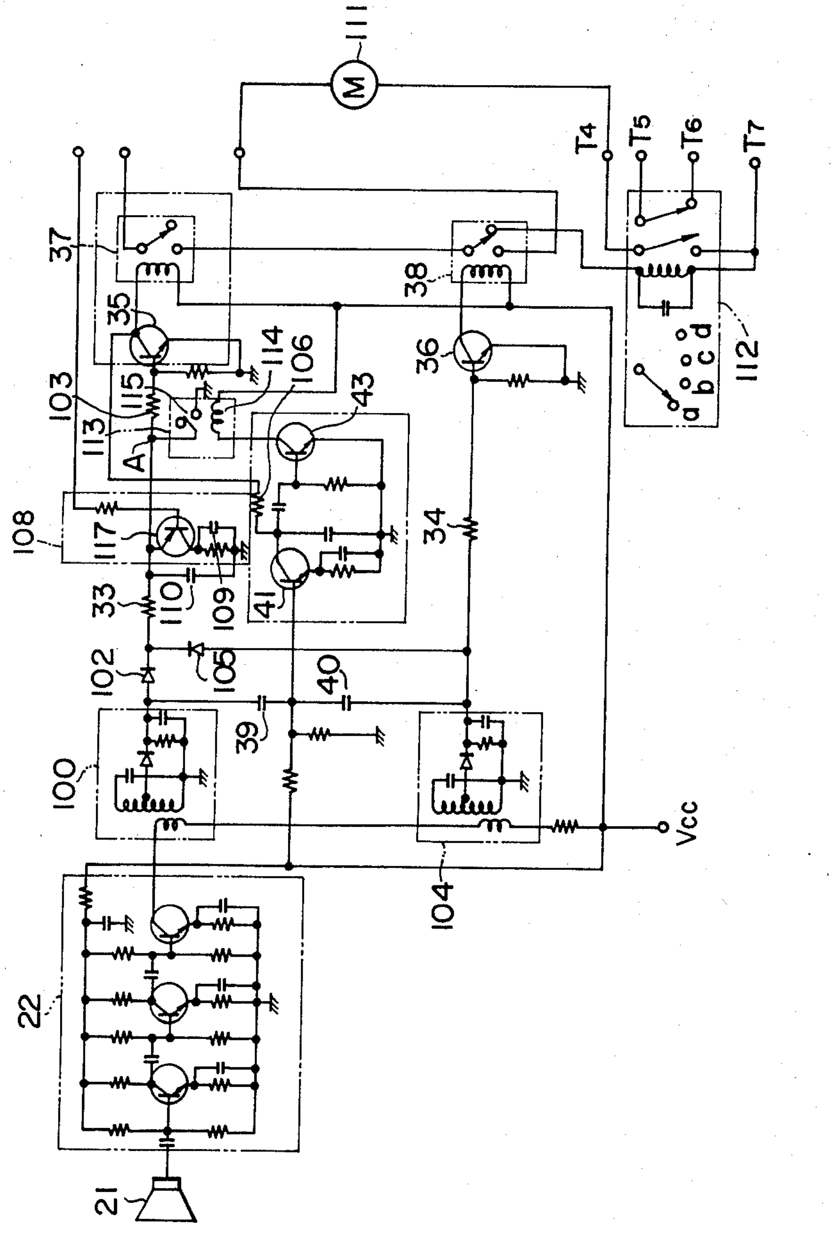
FIG. 6 is a circuit diagram of a fourth embodiment of remote controlled receiving apparatus embodying the invention.

Referring now to FIG. 6, a further embodiment of the invention will be explained. In the figure, numeral 21 designates a wave receiver for detecting the control signal or the noise through which the signal or noise is passed to an amplifier circuit where it is amplified. The amplified control signal or noise is separated in the frequency selecting detector circuits 100 and 104 to be derived as a voltage.

When the control signal is received to generate a voltage at an output terminal of the frequency selecting detector circuit 100, the voltage is applied through the diode 102 and the resistors 33 and 103 to the base of driver transistor 35 so as to enable the transistor 35. Thus, both relay 37 and stepping relay 112 are energized, thereby effecting the volume control and switching of a power source. A movable contact of the stepping relay 112 is transferred through stationary contacts a, b, c and d in this order and functions cooperatively at contact a to disconnect terminals $T_4$ and $T_7$ and connect terminals $T_5$ and $T_6$.

When the control signal is received to generate a voltage at an output terminal of the frequency selecting detector circuit 104, the voltage is applied through resistor 34 to the base of driver transistor 36, which transistor is enabled to energize a relay 38. Concurrently therewith, the output from the frequency selecting detector circuit 104 is also applied to a junction of the diode 102 and resistor 33 to enable the driver transistor 35.

On the other hand, in the case that the noise is received, at the output terminals of both the frequency selecting detector circuits 100 and 104 the alternating components appear, which are applied through the coupling capacitor 39 or 40 to an AC amplifier transistor 41 where they are amplified. The amplified alternating components are applied to the transistor 43 and turn it on.

Numeral 113 designates a relay, the exciting coil of which is connected between the collector of the transistor 43 and a junction of the exciting coil of the relay 37 and that of relay 38. Contact 115 of the relay 113 is connected between the base of driver transistor 35 and ground.

In FIG. 6, numeral 110 designates a capacitor for causing a delay in commencement of the driven circuit unit, and numeral 117 a switching transistor which is conditioned to be conductive only when the power source for a television receiver set is turned on, for the purpose of shunting the capacitor 110 with a capacitor 109. In other words, the shunting of capacitor 109 to the capacitor 110 only when the power source is turned on increases the delay in commencement of the driven circuit unit, thereby preventing the power source for the television receiver set from being turned on by the noise.

Figure 7:
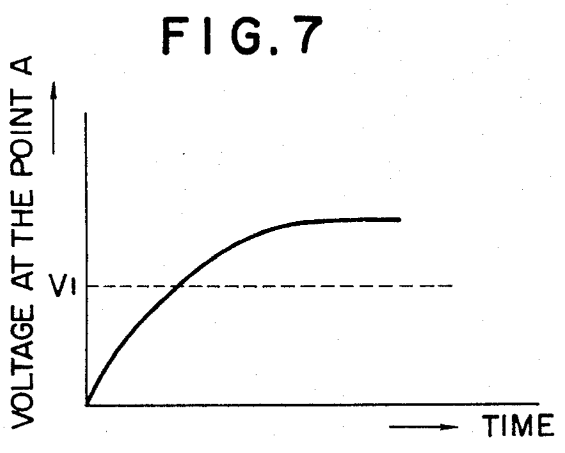
FIG. 7 is a graph depicting the variation in voltage at point A in the circuit shown in FIG. 6 when a control signal is received.

FIG. 7 shows how a voltage at point A varies when the control signal is received with the circuit arrangement shown in FIG. 6. As the voltage at point A exceeds a starting threshold voltage $V_1$ of driver transistor 35, the transistor 35 starts to operate.

With reference to FIG. 8, when the noise is received, a voltage at point A and collector current of the transistor 43 are illustrated as in FIGS. 8(*a*) and 8(*b*), respectively. Upon receipt of the noise, as shown in FIG. 8, the alternating components contained therein are detected with the result that the transistor 43 becomes conductive and a collector current flows. Consequently, the relay 113 is energized and its movable contact 115 is transferred whereby a charge stored in the capacitor 110 is discharged and a potential at point A falls to zero without exceeding the threshold voltage $V_1$. This prevents the driver transistor 35 from being effected.

It will be seen from the foregoing that when the present receiving apparatus receives the noise successively generated, the alternating components contained therein enable the transistor 43 and thus the relay 113 is energized so that the charge stored in the capacitor 110 is so discharged as to disable the driver transistor 35, thereby preventing the erroneous operation due to the noise.

Referring now to FIG. 9 which illustrates a further embodiment of the invention, numeral 21 designates a microphone for sensing an incident signal such as an ultrasonic wave, through which the noise or a carrier frequency signal is passed to an amplifier 22 where it is amplified. Then the amplified noise is separated in filters including transformer coils 23 and 24 and tuning capacitors 25 and 26, and the separated signals are respectively passed through rectifier diodes 27 and 28 to be stored as a voltage in capacitors 31 and 32 shunted by resistors 29 and 30. The stored voltages are applied respectively to the bases of driver transistors 35 and 36 through voltage drop resistors 33 and 34. Numerals 37 and 38 designate relays which are respectively driven by the driver transistors 35 and 36, and when a recitified output from an individual filter exceeds a predetermined value, the corresponding relay 37 or 38 is energized.

Upon receipt of the noise A, B or C as shown in FIG. 2, however, the rectified output, contains alternating components, so that the alternating components are passed through coupling capacitors 39 and 40 to an AC amplifier constituted by a transistor 41 and other elements so as to be amplified, an output of which undergoes rectification in a rectifier diode 42 to be applied to the base of a PNP type transistor 43.

The emitter of transistor 43 is connected to the emitters of driver transistors 35 and 36, its collector being grounded through a resistor 119. The transistor 43 is so conditioned as to be nonconductive when the alternating components contained in the rectified outputs from the rectifier diodes 27 and 28 exceed a predetermined value.

While an embodiment shown in FIG. 9 has employed two filter circuits tunable to different frequencies, one or more than three filters may be employed.

With a circuit shown in FIG. 9, when noise A, B or C of FIG. 2 is received, the transistor 43 becomes nonconductive since the rectified outputs contain alternating components. Consequently the driver transistors 35 and 36 become nonconductive and the relays 37 and 38 are deenergized.

Instead, when an apparatus shown in FIG. 9 receives the control signal at the single frequency, the transistor 43 becomes conductive owing to the rectified output being cleared of alternating components with the result that the driver transistors 35 and 36 become conductive, thereby energizing relays 37 and 38.

Reference is made to FIG. 10 illustrating a further embodiment of the invention, in which the base of transistor 43 is connected to the output terminal of an AC amplifier circuit, its collector to a bias source and its emitter to collector sides of driver transistors 35 and 36.

In case that the noise is received by a circuit shown in FIG. 10, the output from the AC amplifier circuit disables the transistor 43 so that driver transistors 35 and 36 are also disabled, thereby preventing the driven circuit units from being activated.

In a still further embodiment shown in FIG. 11, numeral 21 designates a microphone for sensing an incident signal such as an ultrasonic wave through which the noise or a carrier frequency signal is passed to an amplifier 22 where it is amplified. Then an amplified noise is separated in filters including transformer coils 23 and 24 and tuning capacitors 25 and 26, and the separated signals are respectively passed through rectifier diodes 27 and 28 to be stored as a voltage in capaciotrs 31 and 32 shunted by resistors 29 and 30. The stored voltages are applied respectively to the bases of driver transistors 35 and 36 through voltage drop resistors 33 and 34. Numerals 37 and 38 designate relays which are respectively driven by the driver transistors 35 and 36, and when a rectified output from an individual filter exceeds a predetermined vlaue, the corresponding relay 37 or 38 is energized.

Upon receipt of the noise A, B or C as shown in FIG. 2, however, rectified outputs contain alternating components, so that the alternating components are passed through coupling capacitors 39 and 40 to an AC amplifier constituted by a transistor 41 and other elements so as to be amplified, an output of which undergoes rectification in a rectifier diode 42 to be applied to the base of transistor 43.

To the collector of the transisotr 43 connected is an exciting coil 121 of a relay 120. Between bases of the driver transistors 35 and 36 and ground connected are movable contacts 122 and 123 of the relay 120, respectively. The transistor 43 is set to be enabled by the alternating components contained in the rectified outputs from the rectifier diodes 27 and 28. As the transistor 43 is enabled, the relay 120 is energized so that the bases of driver transistors 35 and 36 are grounded through movable contacts 122 and 123 which have been transferred.

When a circuit shown in FIG. 11 receives the noise A, B or C as shown in FIG. 2, the transistor 43 becomes conductive and energizes the relay 120 since the rectified outputs contain the alternating components. Energization of relay 120 disables the driver transistors 35 and 36 which in turn deenergize the relays 37 and 38, respectively.

But, when the control signal at the single frequency is received by an apparatus shown in FIG. 11, the rectified outputs which do not contain the alternating components disable the transistor 43 whereas they enable the driver transistors 35 and 36 which in turn energize the relays 37 and 38, respectively.

Reference is now made to FIG. 12 illustrating a still further embodiment of the invention. Numeral 21 designates a microphone for sensing an incident signal such as an ultrasonic wave through which the noise or a carrier frequency signal is passed to an amplifier 22 where it is amplified. Then an amplified noise or carrier frequency signal is separated in filters including transformer coils 23 and 24 and tuning capacitors 25 and 26, and the separated signals are respectively passed through rectifier diodes 27 and 28 to be stored as a voltage in capacitors 31 and 32 shunted by resistors 29 and 30, respectively.

The stored voltages are applied respectively to the bases of driver transistors 35 and 36 through voltage drop resistors 33 and 34. Numerals 37 and 38 designate relays which are respectively driven by the driver transistor 35 and 36, and when a rectified output from an individual filter exceeds a predetermined value, the corresponding relay 37 or 38 is energized.

Upon receipt of the noise A, B or C as shown in FIG. 2, rectified outputs contain alternating components, so that the alternating components are passed through coupling capacitors 39 and 40 to an AC amplifier constituted by a transistor 41 and other elements so as to be amplified, an output of which undergoes rectification in a rectifier diode 42 to be applied to the base of a transistor 43.

To the collector of the transistor 43 connected is an exciting coil 125 of a relay 124. Serial connections of movable contacts 126 and 127 to resistors 54 and 55 of the relay 124 are coupled to emitters of the driver transistors 35 and 36, respectively.

The transistor 43 is set to become conductive as the alternating components contained in the rectified outputs from the rectifier diodes 27 and 28 exceed a predetermined value.

Conduction of the transistor 43 results in energization of the relay 124 which transfers movable contacts 126 and 127 to off, thus deenergizing the relays 37 and 38.

Instead, when the control signal at the single frequency is received with an apparatus shown in FIG. 12, the transistor 43 is disabled since the rectified outputs do not contain the alternating components so that the transistors 35 and 36 are enabled by the rectified outputs and the relays 37 and 38 are energized.

FIG. 13 shows another embodiment of the invention in which when the noise is received, the transistor 43 becomes conductive and a relay 128 is energized to transfer movable contacts 129 and 130 thereof to off, causing circuits for relays 37 and 38 to open and the relays 37 and 38 to be deenergized.

With reference to FIG. 14, a further embodiment of the invention is illustrated. In the figure, numeral 21 designates a microphone for sensing an incident signal such as an ultrasonic wave through which the noise or a carrier frequency signal is passed to an amplifier 22 where it is amplified. Then an amplified noise or carrier frequency signal is separated in filters including transformer coils 23 and 24 and tuning capacitors 25 and 26, and the separated signals are respectively passed through rectifier diodes 27 and 28 to be stored as a voltage in capacitors 31 and 32 shunted by resistors 29 and 30. The stored voltages applied respectively to the bases of driver transistors 35 and 36 through voltage drop resistors 33 and 34. Numerals 37 and 38 designate relays which are respectively driven by the driver transistors 35 and 36, and when a rectified output from an individual filter exceeds a predetermined value, the corresponding relay 37 or 38 is energized.

Upon receipt of the noise A, B or C as shown in FIG. 2, however, rectified outputs contain alternating components, so that the alternating components are passed through coupling capacitors 39 and 40 to an AC amplifier constituted by an AC amplifying transistor 41 and other elements so as to be amplified, an output of which undergoes rectification in a rectifier 42 to be applied to the base of a transistor 43. To the emitter of the transistor 43, an exciting coil 132 of a relay 131A is connected. A movable contact 133 of the relay 131A is connected in series to a stationary contact of the relay 37, the other movable contact 134 being connected in series to a stationary contact of the relay 38. In addition, the transistor 43 is set to be enabled when the alternating components contained in the rectified outputs from rectifier diodes 27 and 28 exceed a predetermined value. When the transistor 43 becomes conductive, the relay 131A is energized to transfer movable contacts 133 and 134 thereof to off. Consequently, even when driver transistor 35 or 36 is enabled by the noise to energize relay 37 or 38, disconnection between terminals $T_1$ and $T_3$ or $T_2$ and $T_4$ is performed.

Instead, when the control signal at the single frequency is received with an apparatus shown in FIG. 14, the transistor 43 becomes nonconductive owing to the rectified outputs being cleared of alternating components and the rectified outputs enable the driver transistors 35 and 36, thereby energizing the relays 37 and 38.

Referring to FIG. 15 which illustrates another embodiment of the invention, numeral 21 designates a wave receiver for detecting the control signal or noise through which the control signal or noise is passed to an amplifier 22 where it is amplified, and then the signal amplified is separated in frequency selecting detector circuits 100 and 104 to be derived out as a voltage.

In the case that owing to receipt of the control signal a voltage appears at the output terminal of the frequency selecting detector circuit 100 the voltage is applied through a diode 102 and resistors 33 and 103 to the base of a driver transistor 35 to enable the same, which in turn energizes a relay 37. This energizes a stepping relay 112 and thus the control of volume or on-off switching of a power source is effected. A movable contact of the stepping relay 112 is transferred by the control signal through stationary contacts *a*, *b*, *c* and *d* in this order, and the stepping relay cooperatively disconnects terminals $T_4$ and $T_7$ and connects terminals $T_5$ and $T_6$ when the movable contact stays at contact a.

When the control signal is received and a voltage appears at the output terminal of the frequency selecting detector circuit 104, the voltage is applied through a resistor 34 to the base of a driver transistor 36 to enable it, which transistor in turn energizes a relay 38. The output from the frequency selecting detector circuit 104 is also applied to a junction of the diode 102 and the resistor 33 through a diode 105, and enables the transistor 35.

Instead, when the noise is received, the alternating components develop in the frequency selecting detector circuits 100 and 104, and they are applied through coupling capacitors 39 and 40, respectively, to an AC amplifier transistor 41. The amplified alternating components are applied to a transistor 43 to enable it. This causes a current to flow through the transistor 43 and a voltage drop across the resistor 33 disables the driver transistor 35. In this manner, the driven circuit unit including the driver transistor 35 and the relay 37 cannot be activated by the noise.

A capacitor 110 shown in FIG. 15 is adapted to cause a delay in commencement of the driven circuit unit.

Further, in the figure, numeral 108 generally designates a switching circuit in which to the base of a PNP type switching transistor is applied a positive voltage of about 10 volts from a main apparatus which is remotely controlled via a terminal $T_1$. When the power source to the main apparatus is on, the positive voltage at the terminal $T_1$ makes the switching circuit 108 nonconductive and a capacitor 109 does not affect this circuit.

When the power source is off and a voltage develops in either the frequency selecting detector circuit 100 or 104, the switching circuit 108 becomes conductive, permitting the capacitor 109 to add to a capacitor 110 in parallel therewith, so that delay in commencement of the driven circuit unit is increased. Since the switching circuit 108 increases the delay in the commencement when the power source of the main apparatus is on, it is possible to prevent the erroneous operation of the main apparatus due to the noise.

FIG. 16 illustrates another embodiment of the invention wherein instead of the switching circuit 108 of the previous embodiment, terminals $T_5$ and $T_6$ of the stepping relay 112 are used and a capacitor 132 is connected in parallel relation to a capacitor 131 corresponding to the capacitor 110 of FIG. 15 or disconnected therefrom in response to the switching operation of the stepping relay 112.

More particularly, when the power source of the main apparatus is on, a circuit between the terminals $T_5$ and $T_6$ is opened to prevent the capacitor 132 from being connected to the capacitor 131 in parallel therewith whereas when the power source is off, the terminals $T_5$ and $T_6$ are short-circuited to permit parallel connection of the capacitor 132 with the capacitor 131. This increases the delay in commencement of the driven circuit unit, thereby preventing the power source to main apparatus from being turned on by the noise.

FIG. 17 illustrates a circuit arrangement of another embodiment wherein the capacitor 132 is connected to the collector of driver transistor 35, the operation being the same as in the previous embodiment.

Reference is now made to FIG. 18 of another embodiment of the invention. In the figure, numeral 21 designates a receiver unit for receiving an incident wave such as the noise or the control signal at the single frequency. The incident wave received by the receiver unit 21 is amplified in the amplifier circuit 22. A predetermined frequency component contained in the amplified incident wave is selected in the frequency selecting circuit 100 and then detected in a detector circuit 100'.

As the rectified output from the detector circuit 100' exceeds a predetermined level, the transistor 35 constituting the driven circuit unit 133 is enabled to energize the relay 37. Numeral 134 designates a detector circuit receiving the output from the frequency selecting circuit 100 as an input, the output of which is passed through a capacitor 135 to an AC amplifier transistor 41 where it is amplified, and then applied to the transistor 43. The collector of transistor 43 is connected to the base of transistor 35.

Consequently, when the noise is received, the output of the detector circuit 134 contains the alternating components, which components are amplified and applied to the base of transistor 43 to enable the same. Conduction of the transistor 43 causes a voltage drop across the voltage drop resistor 33 resulting in a decrease in the base voltage of transistor 35, thus disabling the transistor 35.

When the conrol signal at the single frequency is received, the output of detector circuit 134 being cleared of alternating components does not enable the transistor 43 so that the output from the detector circuit 100' enables the transistor 35 which in turn energizes the relay 37.

In this manner, the driven circuit unit 133 is actuated only when the control signal at the single frequency is received and not actuated upon receipt of the noise.

While, in the embodiment, one frequency selecting circuit 100 and one driven unit circuit 133 corresponding thereto have been used, a plurality of frequency selecting circuits for separating a plurality of different frequency components and a plurality of driven unit circuits corresponding thereto may be employed.

Referring now to FIG. 19 illustrating another embodiment of the invention, numeral 21 designates a receiver unit for receiving an incident wave such as the noise or control signal at the single frequency. The incident wave received by the receiver unit 21 is amplified in the amplifier circuit 22. A predetermined frequency component contained in the amplified incident wave is selected in the frequency selecting circuit 100 and then detected in a detector circuit 100'. As the rectified output from the detector 100' exceeds a predetermined level, the transistor 35 constituting the driven unit circuit 133 is enabled to energize the relay 37.

Numeeral 104 designates another frequency selecting circuit connected in parallel with the frequency selecting circuit 100. After being subjected to amplification in the amplifier circuit 22, the predetermined frequency component contained in the incident wave amplified is selected in this frequency selecting circuit 104 and detected in the succeeding detector circuit 104'.

The detected output of detector circuit 104' is passed through a capacitor 135 to an AC amplifier transistor 41 where it is amplified and then applied to the base of transistor 43 whose collector is connected to the base of transistor 35.

With this circuit arrangement, when the noise is received, the output of the detector circuit 104' contains the alternating components, which components are amplified in an AC amplifier transistor 41 and applied to the base of transistor 43 to turn it on. Conduction of the transistor 43 causes a voltage drop across the voltage drop resistor 33 resulting in a decrease in the base voltage of transistor 35, thus disabling the same.

When the control signal at the single frequency is received, the output of the detector circuit 104' being cleared of the alternating components disables the transistor 43 so that the output of detector circuit 100' enables the transistor 35, which in turn energizes the relay 37.

As explained above, te driven unit circuit 133 is actuated only when the control signal at the single frequency is received and not actuated upon receipt of the noise.

While, in the embodiment, one frequency selecting circuit 100 and one driven unit circuit 133 corresponding thereto have been used, a plurality of frequency selecting circuits for separating a plurality of different frequency components and a plurality of driven unit circuits corresponding thereto may be employed.

Now, reference is made to FIG. 20 illustrating another embodiment of the invention. In the figure, numeral 21 designates a receiver unit for receiving an incident wave such as the noise or control signal at the single frequency. The incident wave received by the receiver unit 21 is amplified in the amplifier circuit 22. A predetermined frequency component contained in the incident wave amplified is selected in the frequency selecting circuit 100 and then detected in a detector circuit 100'. As the rectified output from the detector 100' exceeds a predetermined level, the transistor 35 constituting the driven unit circuit 133 is enabled to energize the relay 37. Numerals 21', 22', 136 and 136' designate respectively a receiver unit, amplifier circuit, frequency selecting circuit and detector circuit equivalent to components 21, 22, 100 and 100'. The output of the detector circuit 136' is applied to an AC amplifier transistor 41 through a capacitor 137. Numeral 43 designates an inhibit transistor with the collector thereof connected to the base of the transistor 35, which inhibit transistor is driven by an output of the AC amplifier transistor 41.

In the case that the noise is received with receiver units 21 and 21°, as will be seen from FIG. 20, the output from the detector circuit 136° contains the alternating components. The alternating components are passed through a capacitor 137 to the AC amplifier transistor 41 and amplified therein. The output of the AC amplifier transistor 41 enables the transistor 43. Once the transistor 43 becomes conductive, a voltage drop is caused across the voltage drop resistor 33 with the result that the base voltage of the transistor 35 decreases and the transistor 35 stands nonconductive.

When the control signal at the single frequency is received, the output from the detector circuit 136' being cleared of alternating components disables the transistor 43 constituting an inhibit circuit 107 so that the output of the detector circuit 100' enables the transistor 35 which in turn energizes the relay 37.

In this manner, the driven unit circuit 133 is actuated only when the control signal at the single frequency is received and not actuated upon receipt of the noise.

While, in the embodiment, one frequency selecting circuit 100 and one driven unit circuit 133 corresponding thereto hae been used, a plurality of frequency selecting circuits for separating a plurality of different frequency components and a plurality of driven unit circuits corresponding thereto may be employed.

What is claimed is:

1. A remote controllable receiving apparatus comprising a receiver unit for receiving an incident signal wave, a plurality of frequency selection circuits which are respectively tunable to a plurality of different control frequency components contained in the received signal wave for control of the apparatus, a plurality of detector circuits for detecting first output signals supplied from said frequency selection circuits respectively, said detector circuits having respective output terminals for providing second output signals corresponding to said first output signals, a plurality of switching circuits, each including a first transistor, for turning on in response to said second output signals of said detector circuits above definite levels thereof respectively, a plurality of controllable devices which are on-off controlled by the respective switching circuits, an inhibit circuit for detecting AC noise components included in the second output signals of said detector circuits to turn off said switching circuits, and first capacitor means, connected between ground and the base of said first transistor and between ground and said output terminals of said detector circuits, for retarding the turn-on of said switching circuits to avoid the turn-on of said switching circuits due to the AC noise components and to allow the turn-on of said switching circuits due only to the control frequency components, said first capacitor means being connected to said inhibit circuit to discharge through said inhibit circuit when the AC noise components are detected.

2. An apparatus as claimed in claim 1 wherein said receiver unit comprises a microphone and an amplifier.

3. An apparatus as claimed in claim 1 wherein said controllable devices comprise relay means.

4. An apparatus as claimed in claim 1 wherein said inhibit circuit comprises second capacitor means connected to the output terminals of said detector circuits for taking out the AC noise components of the second output signals of said detector circuits, amplifier means for amplifying the AC components taken-out, and a single second transistor whose emitter and collector are connected between said output terminals and ground, said second transistor being on-off controlled by said amplifier means.

5. A remote controllable receiving apparatus according to claim 1 wherein said inhibit circuit comprises second capacitor means connected to the output terminals of said detector circuits for deriving the AC noise components contained in the second output signals of said detector circuits, means for amplifying the derived AC components, and relay means, connected to said amplifying means, for grounding output signals of said first capacitor means to turn off said controllable devices by said switching circuits.

* * * * *